(12) United States Patent
Chia et al.

(10) Patent No.: US 6,675,517 B1
(45) Date of Patent: Jan. 13, 2004

(54) SIGNBOARD

(76) Inventors: Dandy Chee Hua Chia, Blk 300, 3 Serangoon Avenue #09-373, Singapore (SG), 550330; Jimmy Yih Fah Chia, Blk 135, Lorong Ah Soo #04-484, Singapore (SG), 530135; Maurice Choow Fah Chia, 6 Keng Chin Road #01-07, Singapore (SG), 258709

( * ) Notice: Subject to any disclaimer, the term of this patent is extended or adjusted under 35 U.S.C. 154(b) by 0 days.

(21) Appl. No.: 09/831,998

(22) PCT Filed: Nov. 15, 1999

(86) PCT No.: PCT/SG99/00121

§ 371 (c)(1),
(2), (4) Date: May 16, 2001

(87) PCT Pub. No.: WO00/30061

PCT Pub. Date: May 25, 2000

(30) Foreign Application Priority Data

Nov. 17, 1998 (SG) .......................... 9804080-1

(51) Int. Cl.⁷ .............................. G09F 7/02; G09F 7/00
(52) U.S. Cl. ......................... 40/611.01; 40/618; 40/620
(58) Field of Search ........................... 40/489, 611, 617, 40/618, 620, 622, 658, 642.02, 576; 301/37.31, 37.34, 37.109, 37.25; 52/127.6, 127.8, 476; 403/41, 289, 290, DIG. 11

(56) References Cited

U.S. PATENT DOCUMENTS

| | | | | |
|---|---|---|---|---|
| 2,548,070 A | * | 4/1951 | Ryan ........................... 40/587 |
| 2,588,050 A | * | 3/1952 | Rutherford ................... 40/611 |
| 2,926,955 A | * | 3/1960 | Lyon ......................... 301/5.21 |
| 2,964,356 A | * | 12/1960 | Lyon ....................... 301/37.34 |
| 2,964,358 A | * | 12/1960 | Lyon ....................... 301/37.34 |
| 3,419,979 A | * | 1/1969 | McVicker et al. ............ 40/618 |
| 3,495,347 A | * | 2/1970 | Sims ....................... 301/37.25 |
| 4,059,914 A | | 11/1977 | Dobson ....................... 40/125 |
| 4,270,292 A | | 6/1981 | Eckberg, II .................. 40/611 |
| 4,779,369 A | * | 10/1988 | Hill et al. ..................... 40/611 |
| 4,886,694 A | * | 12/1989 | Donnard ..................... 428/137 |
| 4,981,329 A | * | 1/1991 | Koch et al. .............. 301/37.25 |
| 5,307,581 A | * | 5/1994 | Kalmykow .................. 40/585 |
| 5,464,276 A | * | 11/1995 | Ott .......................... 301/37.34 |
| 6,309,027 B1 | * | 10/2001 | Smith .................... 301/37.109 |
| 6,405,467 B1 | * | 6/2002 | Dedlow ....................... 40/782 |

FOREIGN PATENT DOCUMENTS

| | | |
|---|---|---|
| FR | 2404882 | 4/1979 |
| FR | 2673309 | 8/1992 |
| GB | 2034504 | 6/1980 |

* cited by examiner

Primary Examiner—S. Joseph Morano
Assistant Examiner—Jason R. Bellinger
(74) Attorney, Agent, or Firm—Ostrolenk, Faber, Gerb & Soffen, LLP

(57) ABSTRACT

A signboard apparatus is disclosed comprising a plurality of clip members (6, 8) onto which panels (20, 22) are removably attached. The clip members have a curved panel engaging surface for engaging the lip of a panel in snap-fit engagement.

15 Claims, 5 Drawing Sheets

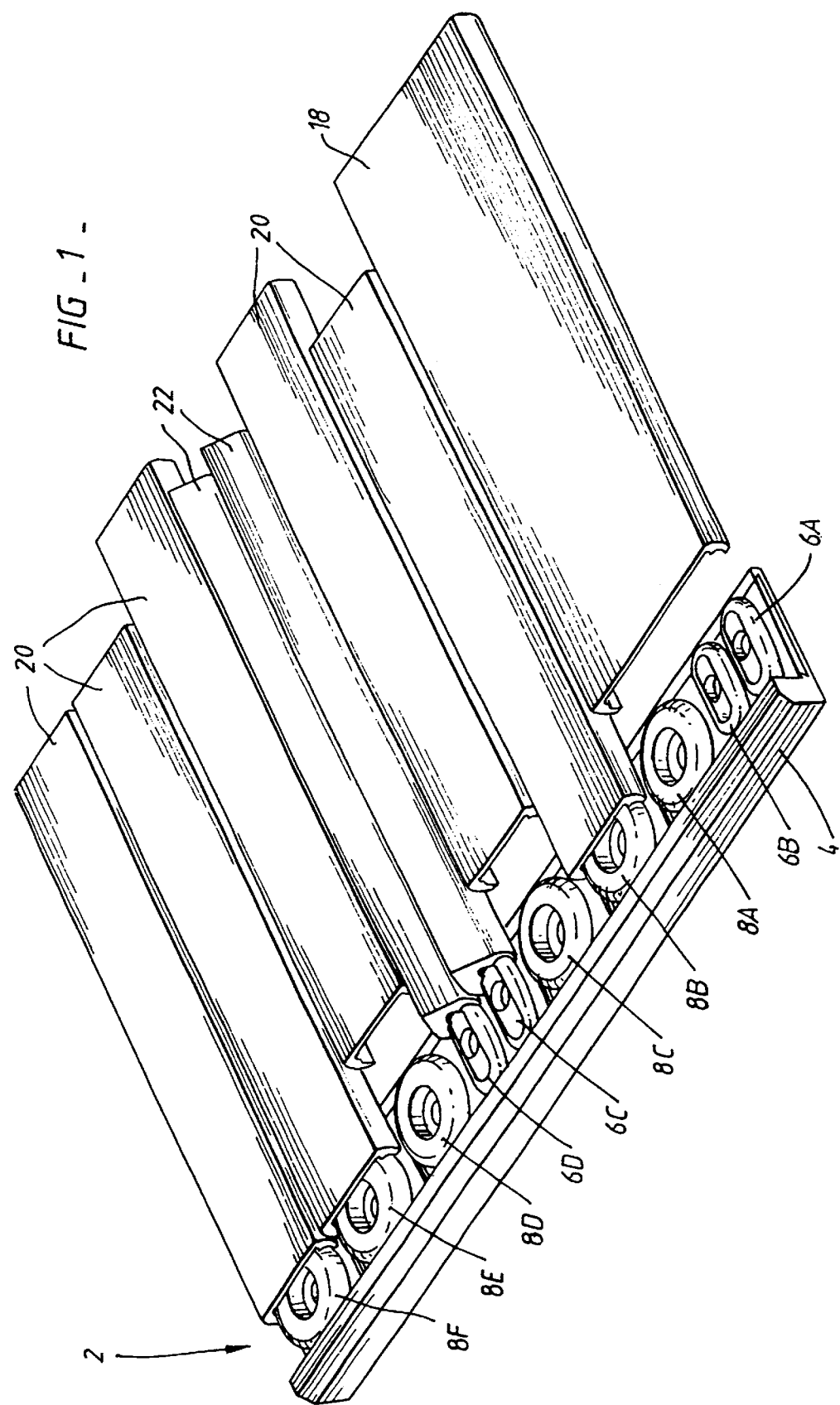

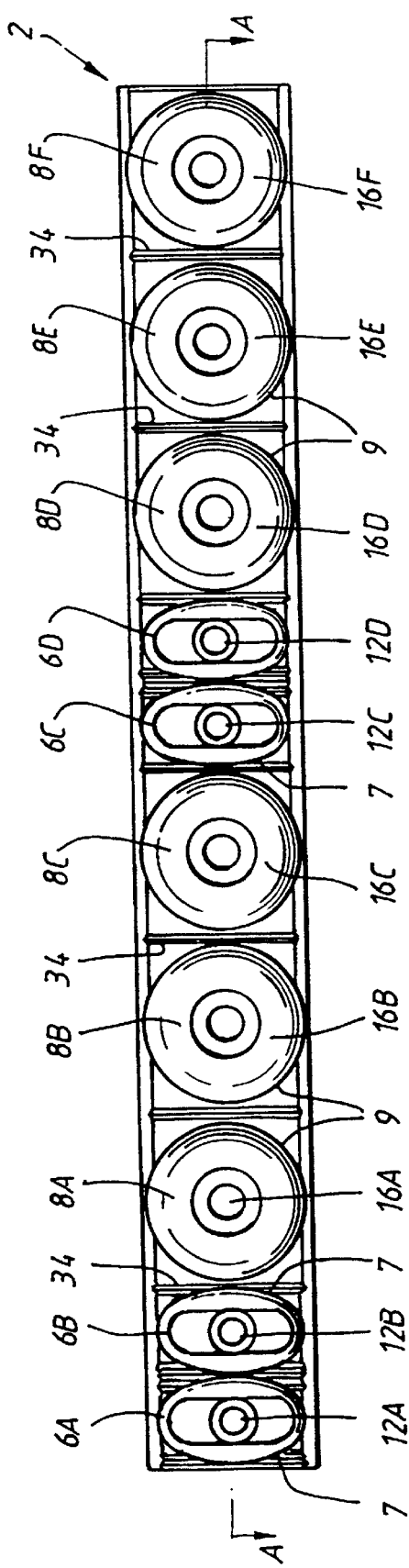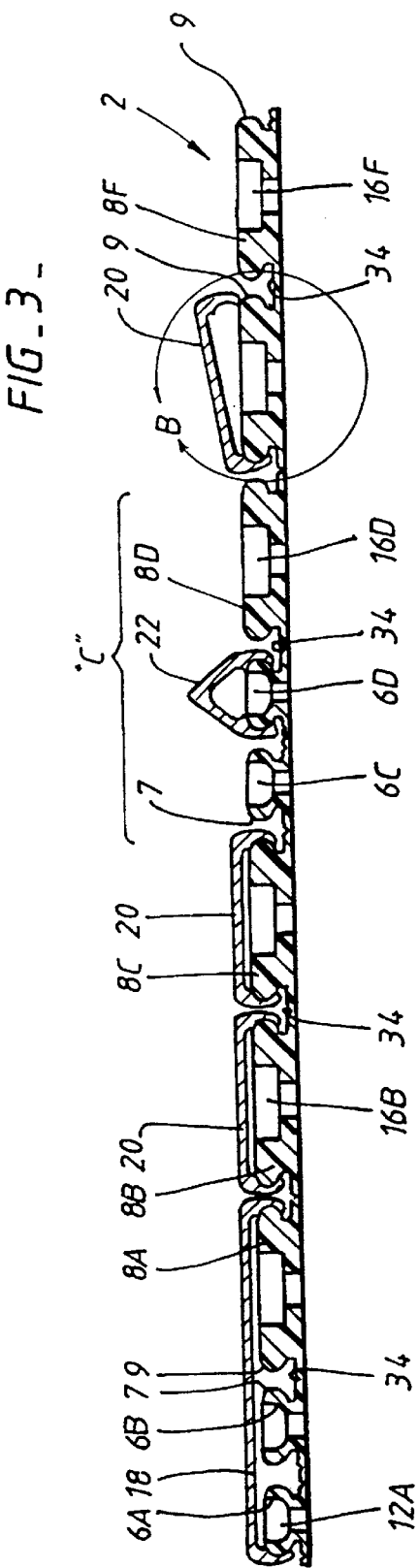

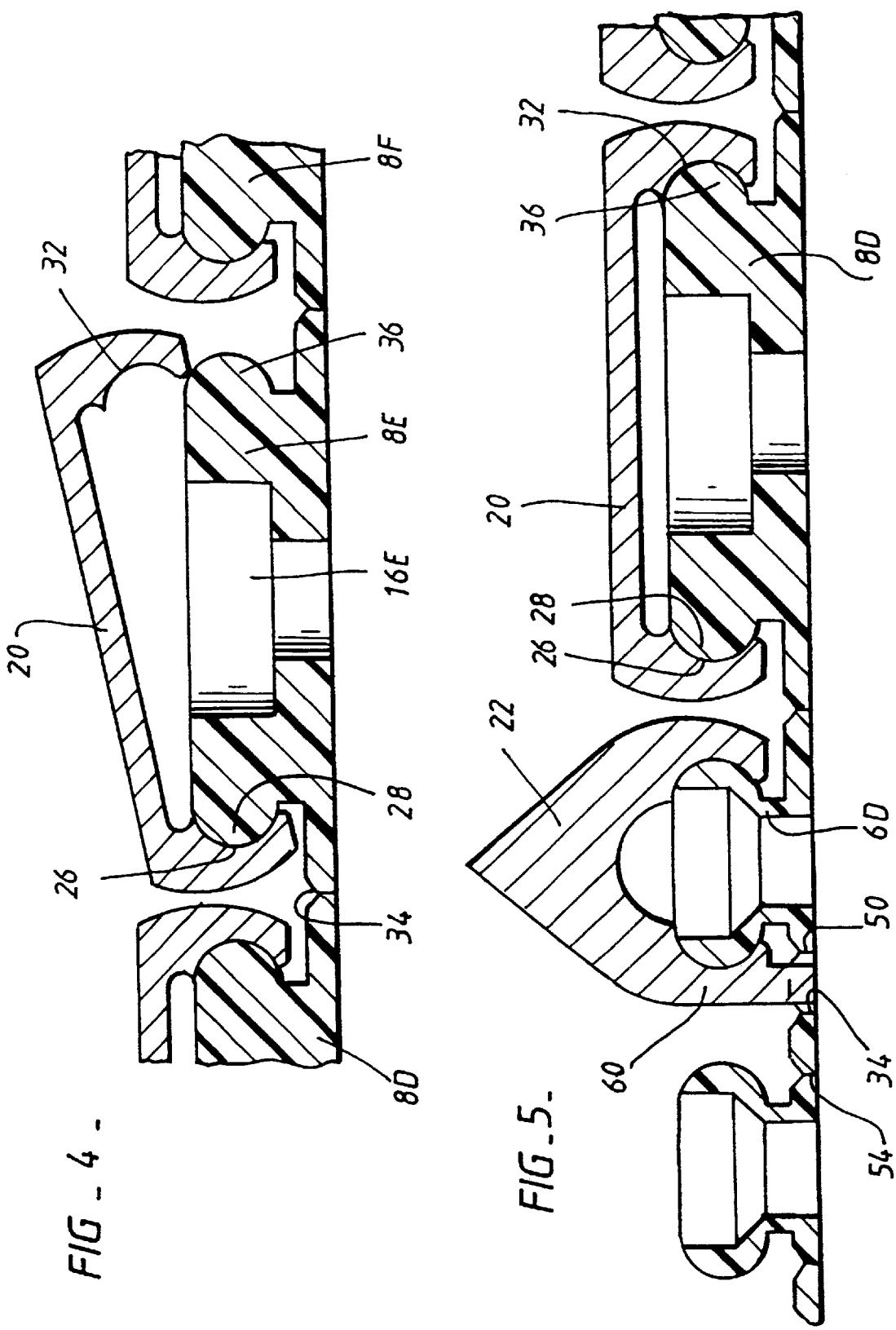

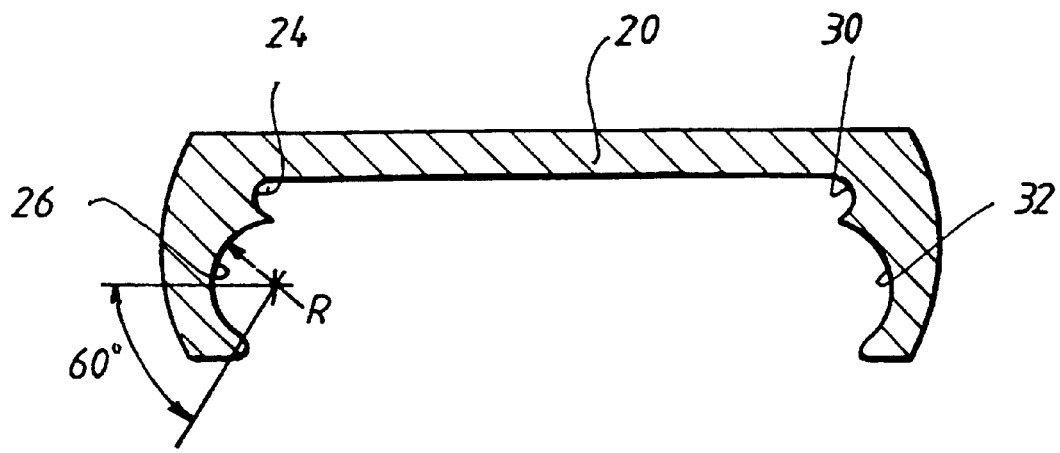
FIG_6.
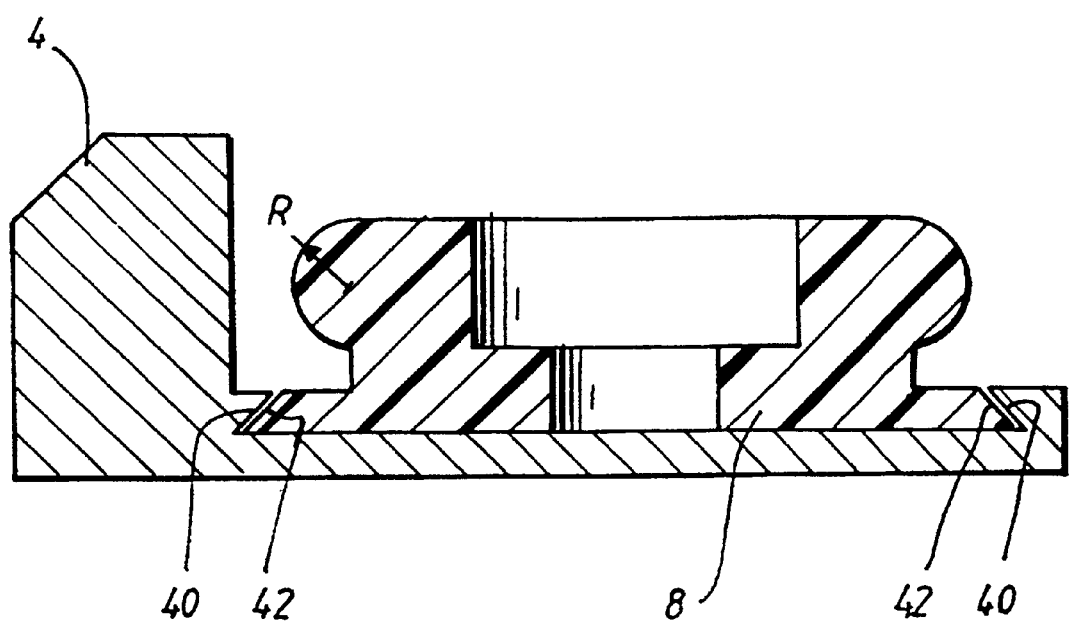
FIG_7.

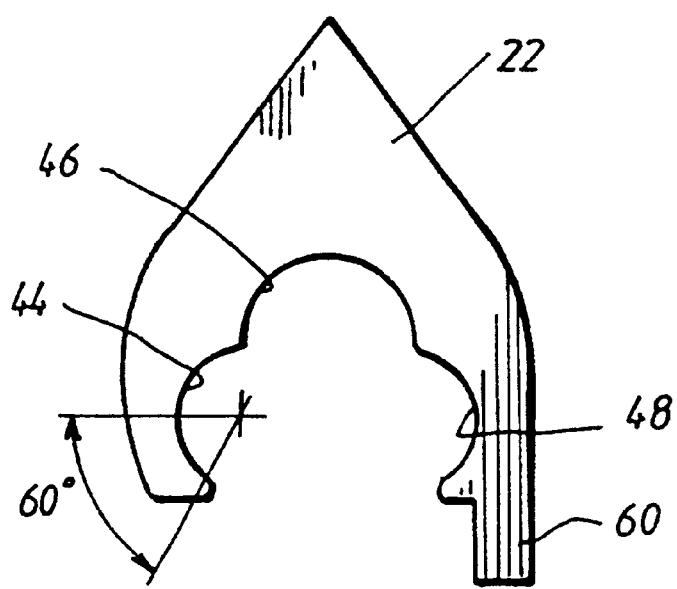
FIG_8_
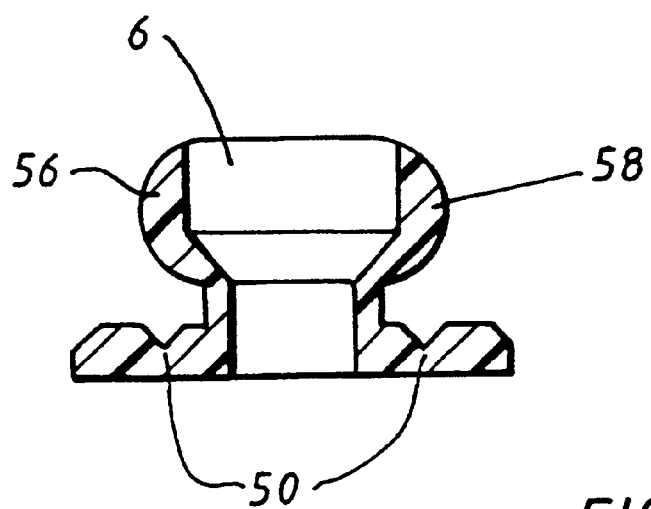
FIG_9_

SIGNBOARD

BACKGROUND OF THE INVENTION

1. Field of the Invention

This invention relates to a signboard and component parts thereof.

2. Related Art

Signboards have been proposed in which a plurality of panels bearing information can be attached to a surface by engagement of the panels with respective retaining clips connected to the surface.

The clips include resilient engagement members which deform to engage the panel in a snap-fit arrangement. The engagement members are subjected to considerable strain in the engagement process and are consequently susceptible to failure after few clipping and unclipping operations.

It is an object of the invention to provide a signboard and component parts thereof which alleviate this problem.

BRIEF SUMMARY OF THE INVENTION

It is an object of the invention to provide a signboard and component parts thereof which alleviate this problem.

In the described embodiment of the invention, the clip members are either of generally circular, oval or slightly barrelled form, an arcuate portion of each member forming the panel-engaging surface. When a panel is clipped to the member, since the engaging surface is of curved form, there is only a small area of contact between the panel and the clip member. This results in a concentration of pressure, so that relative deformation of the panel and clip to allow engagement can be greater for the same level of applied force. The construction of these components can thus be more robust in comparison with the prior art.

BRIEF DESCRIPTION OF THE DRAWINGS

An embodiment of the invention, will now be described by way of example, with reference to the accompanying drawings in which:

FIG. 1 is a perspective view of an embodiment of the invention;

FIG. 2 is a plan view of a strip of clips;

FIG. 3 is a cross-sectional front view across A—A of FIG. 2 with Panels attached;

FIG. 4 is an enlarged view of "B" of FIG. 3;

FIG. 5 is an enlarged view of "C" of FIG. 3 with an additional panel 20 attached;

FIG. 6 is an enlarged cross-sectional end view of a panel of FIG. 3;

FIG. 7 is an enlarged cross-sectional end view of a clip 8 and rail of FIG. 1;

FIG. 8 is an enlarged front view of a panel 22 of FIG. 3; and

FIG. 9 is an enlarged view of a clip 6 of FIG. 1.

DETAILED DESCRIPTION OF THE INVENTION

FIG. 1 is a perspective view of a sign board comprising two strips 2 of clips (of which one is shown) which slidably engage a support rail 4. A plurality of extruded aluminium panels 18, 20, 22 extend between the rows of clips and are connected thereto. The clips are formed from injection moulded plastics material e.g., polyethylene. The clips are of two shapes clips 6 and clips 8.

Panels 22 provide signboard dividers, between regions comprising different kinds of information or different offices for example and signboard edges, while panels 18, 20 have information provided upon them.

FIG. 2 is a plan view of the strip of clips 2. Clips 6A, 6B, 6C, and 6D have oval or barrel shaped heads having curved, preferably arcuate panel-engaging surfaces 7. Clips 8A, 8B, 8C, 8D, 8E and 8F are circular shaped panel-engaging surfaces 9. The clips 6 and 8 have bores 12 and 16 respectively, for fastening the clips to a wall or board by means of screws, for example.

FIG. 3 is a side view of the strip of clips 2. A single panel 18 is clipped onto three clips 6A, 6B and 8A. Panels 20 are respectively clipped onto each of the clips 8B and 8C. Panels 22 are respectively clipped onto each of the clips 6C and 6D.

Grooves 34 are formed in the moulded plastics between each clip provide cutting guides so that the strip of clips 2 can be parted accurately when the clips need to be separated. The length of the row of clips 2 may thus be varied and the relative position of the two kinds of clip 6, 8 changed in accordance with need.

By comparison of FIGS. 2 and 3, it can be seen that the clips are curved not just in two-dimensions, but also in the third dimension, since each clip has a curved panel-engaging surface 7 in plan as shown in FIG. 2, this surface also being curved in cross-section as shown in FIG. 3.

FIG. 4 is an enlarged view of the partially engaged panel 20 and clip 8E. Engagement is performed by first engaging concave lip 26 of the panel with side 28 of the clip and then applying pressure to force lip 32 over side 36. The edge 32 engages the side 36 almost tangentially, thus concentrating the force applied to the panel and clip, making relative deformation of these components, to allow engagement in a snap-fit manner, easier.

FIG. 5 is an enlarged view of the panel 20 clipped onto the clip 8 and the panel 22 clipped onto the clip 6. The panel 20 is retained by clip 8 by the two concave outer edges 26 and 32 being held firmly by the edges 28 and 36 respectively.

FIG. 6 is an enlarged cross-sectional front view of the panel 20, showing concave edges 26, 32 in greater detail. The concave edge 26 is of the same or marginally larger radius R as the edge of the clip. The edge 26 also extends 60° from horizontal, to ensure a firm grip on the clip once attached.

As shown in FIG. 7, the rail 4 has a two longitudinally extending triangular grooves 40 in which corresponding formations 42 of the clips are retained when the clip is slid on to the rail.

FIG. 8 is an enlarged view of clip 22. The clip 22 has similar concave edges 44, 48 to panels 20. FIG. 9 shows a clip 6 onto which the panel 22 attaches. The clip 6 has convex edges 56, 58. The concave edge 44 clips onto the convex edge 56 and the concave edge 48 clips onto the convex edge 58.

At each end of the signboard, panel 22 is connected to a clip 6. Limb 60 of panel 22 extends over the clip 6 covering this to provide a neat finish to the end of the signboard. Grooves 50 formed on one or both sides of the clip 6 are cutting guides so that the strip can be parted accurately to accommodate limb 60 wherever panel 22 is positioned. For example in FIG. 5, the panel 22 is used as a divider and the strip is broken at 50 and 34, with the intervening portion being removed to accommodate limb 60.

From the above description on the general features and working principles of the signboard apparatus, it would be obvious to a person skilled in the art that there are many variations and alternative embodiments that may be used in substitution of the parts of the present invention. For example, the clips may be provided individually or connected with one other, for example, formed a strip as shown, permitting numerous permutations. Furthermore, although the clips have been shown with two curved the present invention as illustrated by specific preferred embodiment described herein and shall be considered as falling within the scope of the following claims.

What is claimed is:

1. A signboard apparatus comprising a plurality of clip members to which panels are removably attachable in snap-fit engagement, each clip member having a curved panel-engaging surface such that it contacts a lip of the panel substantially at a single point when the panel is being attached; the plurality of clip members are connected together by being formed together as a single piece; and parting guides formed between the clips.

2. A signboard apparatus comprising a plurality of clip members to which panels are removably attachable in snap-fit engagement, each clip member having a curved panel-engaging surface such that it contacts a lip of the panel substantially at a single point when the panel is being attached, and a plurality of panels, each panel being removably attachable to at least one of the plurality of clip members.

3. Apparatus as claimed in claim 2, wherein said panels are of different sizes.

4. A signboard comprising a plurality of clip members arranged in spaced pairs, and a plurality of panels connectable in snap-fit engagement between spaced pairs of the clip members, the panels having lips, the clip members each having an arcuate panel-engaging surface so shaped that the surface contacts the lip of the panel substantially at a single point when the panel is being attached.

5. A signboard as claimed in claim 4, wherein the signboard has an edge and the plurality of panels includes a first type of panel that displays information, and a second type of panel that provides a divider between panels of the first type and the edge of the signboard.

6. A signboard as claimed in claim 5, wherein the spaced pairs of clip members include a first type of clip, and spaced pairs of the first type of clip are adapted for engagement with the first type of panel, the spaced pairs of clip members include a second type of clip, and spaced pairs of the second type of clip are adapted for engagement with the first or the second type of panel.

7. A signboard as claimed in claim 6, further including a support for the clip members, and wherein:

the second type of panel includes first and second opposed limbs, the limbs having inner surfaces which define the lips for engagement with the second type of clip members; and one of the limbs extends beyond the lip defined thereby.

8. A signboard as claimed in claim 7, wherein the second type of clip includes a portion adjacent to the support which is removable to accommodate the extended limb of the second type of panel after assembly.

9. A signboard as claimed in claim 4, wherein at least one clip member has a circular periphery.

10. A signboard as claimed in claim 4, wherein at least one clip member has an oval periphery.

11. A signboard as claimed in claim 4, wherein the panel-engaging surface is three-dimensionally curved.

12. A signboard as claimed in claim 9, wherein the panel-engaging surface is three-dimensionally curved.

13. A signboard as claimed in claim 10, wherein the panel engaging surface is three-dimensionally curved.

14. A signboard as claimed in claim 4, wherein the plurality of clip members are connected together.

15. A signboard as claimed in claim 4, wherein the said panels are of different sizes.

\* \* \* \* \*